United States Patent [19]

Griffith Charles A.

[11] Patent Number: 4,693,122

[45] Date of Patent: Sep. 15, 1987

[54] METHOD AND APPARATUS FOR CALIBRATING A MATERIAL-SPREADING APPLICATOR

[76] Inventor: Charles A. Griffith, Rte. 5, Box E44, Ardmore, Okla. 73401

[21] Appl. No.: 830,226

[22] Filed: Feb. 18, 1986

[51] Int. Cl.⁴ ..................... G01M 19/00; G01F 25/00
[52] U.S. Cl. ............................................. 73/861; 73/3; 73/865.9
[58] Field of Search ................ 73/1 R, 3, 432 V, 168, 73/432 R, 861, 865.9, 432.1

[56] References Cited

U.S. PATENT DOCUMENTS

| | | | |
|---|---|---|---|
| 1,830,311 | 11/1931 | Clark | 73/3 X |
| 3,451,252 | 6/1969 | Horton et al. | 73/1 R |
| 3,459,049 | 8/1969 | Kamps | 73/432 V |
| 4,063,449 | 12/1977 | Griggs | 73/3 X |
| 4,409,845 | 10/1983 | Stuttlebam et al. | 73/168 X |
| 4,491,023 | 1/1985 | Graet | 73/432 V X |

OTHER PUBLICATIONS

Calibration of Planting and Applicating Equipment by Charles A. Griffith, Agronomist, Feb. 1986.

*Primary Examiner*—Tom Noland
*Attorney, Agent, or Firm*—Alan T. McCollom

[57] ABSTRACT

Method and apparatus for calibrating a material-spreading applicator. A broadcast spreader or planter is moved over a field for a measured length. The amount of fertilizer or seed which the applicator would have spread over the surface while it was so moved is caught. The area on which the caught material would have been spread is calculated and the caught material is weighed. Thereafter the weight of the caught material is divided by the calculated area. Another aspect of the invention comprises a weighing apparatus having an elongate arm with a weight slidable therealong. A container having a conical shape is mounted on one end of the arm and a support is pivotally attached to the arm between the container and the weight.

5 Claims, 6 Drawing Figures

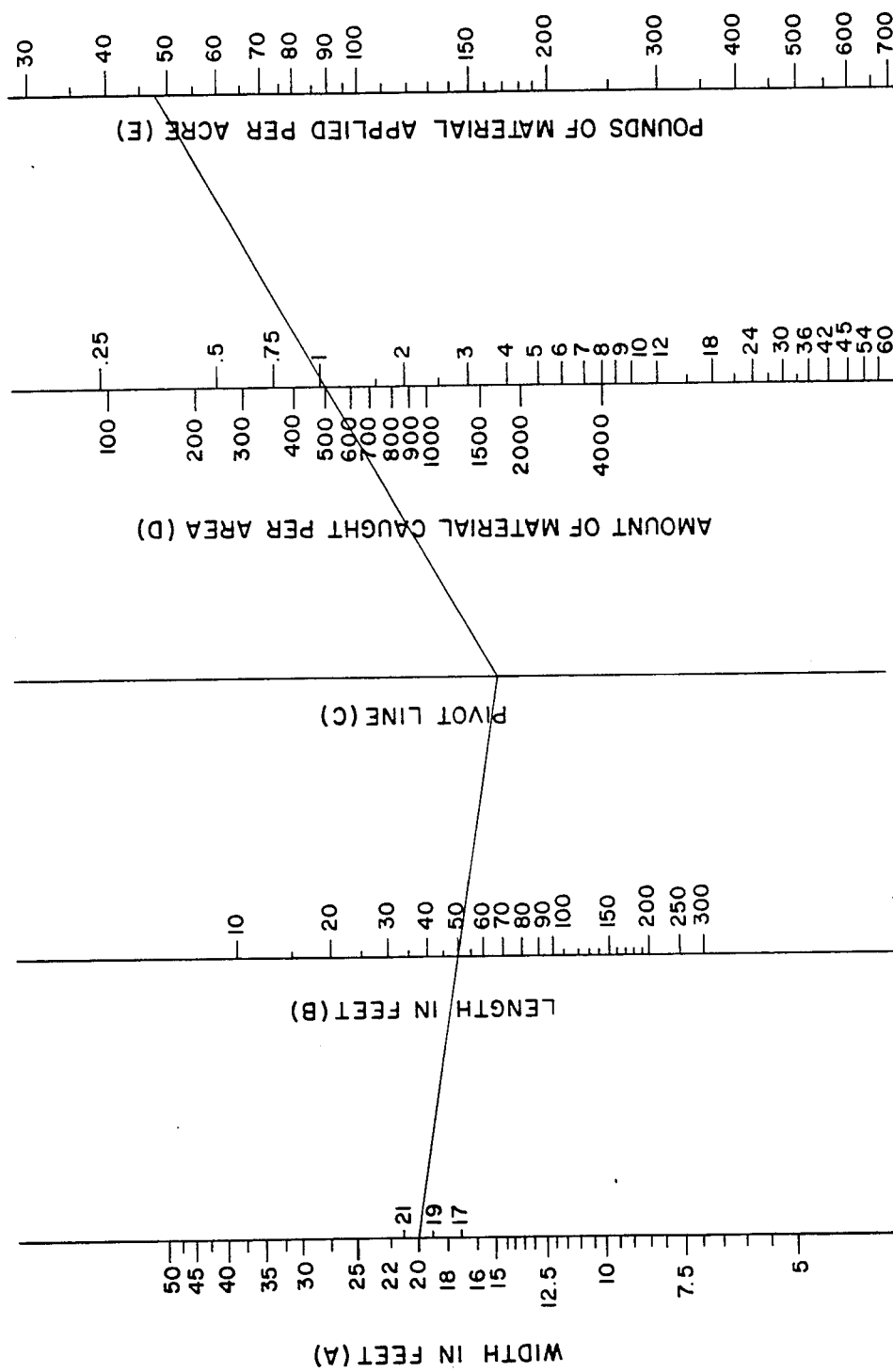

4,693,122

METHOD AND APPARATUS FOR CALIBRATING A MATERIAL-SPREADING APPLICATOR

BACKGROUND AND SUMMARY OF THE INVENTION

The instant invention pertains to methods and apparatus for calibrating a material-spreading applicator (also referred to as a spreader) and more particularly to such methods and apparatus for calibrating applicators of the type which spread material on a surface as the applicator moves thereover.

Applicators which spread material on a surface are used in farming to spread seed, pesticide, and fertilizers on a field. Such agricultural applicators are typically loaded with the material to be distributed and hitched to a tractor. The applicator includes a control which dispenses the material at a selected rate as the tractor pulls the applicator over the field. Optimum applications, in total quantity per unit field area, for different materials are known, for example, fifteen to twenty-five pounds of alfalfa per acre; one to two pounds of small hog clover per acre; and forty-five to seventy-five pounds per acre of field beans are the ranges of optimum applications for these particular crops. The foregoing crops are planted in rows having a preselected width between one another. The applicators which are used to spread these seeds do so in evenly-spaced rows having a preselected distance therebetween.

Other types of material, typically fertilizer and pesticide, are intended to be uniformly or broadcast spread over the entire field. As in the case of seed spreading, each different type of fertilizer or pesticide has a recommended quantity per acre at which it should be applied to a field. Broadcast spreaders, like row spreaders, include a control for varying the quantity per acre at which material is distributed.

The control, on both broadcast and row spreaders, for varying the rate at which material is spread on the field as the applicator moves is typically a lever having a numerical scale for indicating relative lever positions. The scale generally does not indicate quantity per acre of material spread because the density of materials to be spread varies and thus the applicator must be calibrated for each type of material. Moreover, because even the same material can vary slightly in density and because of the inexact nature of the controls on most applicators, it is desirable to calibrate the applicator each time material is spread.

There exists a prior art method for calibrating a row spreader in which the spreader is pulled for a measured length and the material which would have been spread over the measured length is caught. The volume of the caught material is determined and a graph is used to determine the pounds per acre at which the material is spread when the row width, material volume spread per foot of row length, and pounds per bushel of the material is known. The pounds per bushel is determined by reference to a chart.

The above-described prior art method suffers from several disadvantages. First, since the density of material may vary, use of a single assigned density for a given material injects error into the calibration procedure. Secondly, the density of material being spread must be known. Also, the prior art method cannot be used to calibrate materials such as pesticide and fertilizer which are typically broadcast spread.

The present invention provides a method and apparatus for calibrating broadcast and row spreaders. The spreader is moved over a surface for a measured length and the amount of material which it would have spread while it was so moved is caught. The area on which the caught material would have been spread while the applicator was so moved is calculated and the caught material is weighed. Dividing the weight of the caught material by the calculated area produces the application rate of the material.

In another aspect of the invention, apparatus for weighing the material is provided which includes an elongate arm having a weight slidable therealong. A container is mounted on one end of the arm and is conical in shape. A support is pivotally attached to the arm between the container and the weight and is used to suspend the arm when material is placed in the container for weighing. The apparatus may also be used to determine the density of a material.

The instant invention overcomes the above-described disadvantages inherent with prior art methods and apparatus. These and other advantages of the instant invention will become more fully apparent when the following detailed description is read in view of the accompanying drawings, wherein:

FIG. 6 is a chart for use in accordance with the instant invention for calibrating a broadcast spreader.

DETAILED DESCRIPTION OF THE PREFERRED EMBODIMENT OF THE METHOD AND APPARATUS OF THE INVENTION

Figure 2:
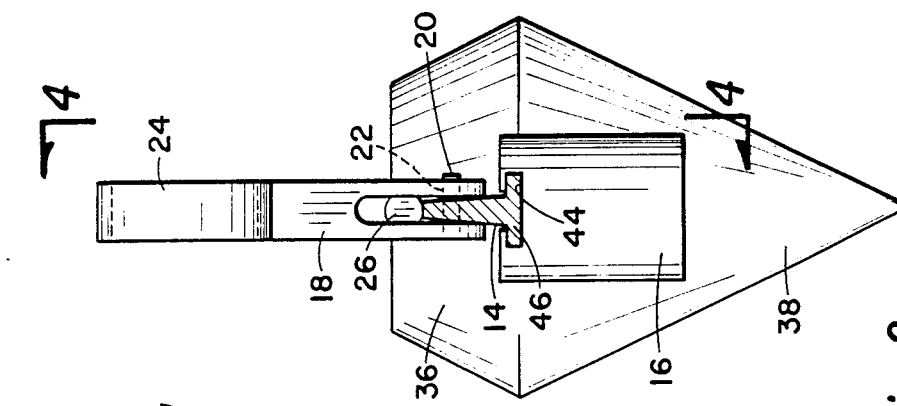
FIG. 2 is a view taken along line 2—2 in FIG. 1.

Indicated generally at 10 is a combined density meter and scale constructed in accordance with the instant invention. Scale 10 includes a container 12 which is rigidly connected to elongate arm 14. The arm includes a weight 16 which is slidable along the length of the arm. A support 18 is pivotally attached by a screw 20 to arm 14 and is received in a bore 22 (in FIG. 2) formed through the arm. A ring 24 is fixedly attached to the upper end of support 18 and may be used, as will later hereinafter be described, to support scale 10 when weighing material or when determining material density.

A level 26 is mounted on the upper surface of arm 14 adjacent container 12. Level 26 comprises a sealed cylindrical tube 28, such being almost filled with liquid. An air bubble 30 is formed in tube 28 and tends to move toward the highest end of the tube. When the tube perfectly level bubble 30 is centered between the tube ends and between a pair of lines 32, 34.

Figure 3:
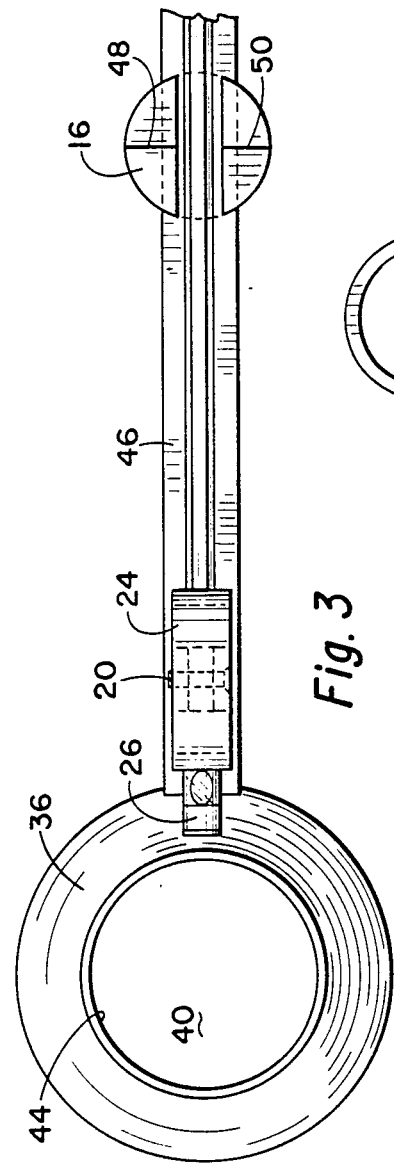
FIG. 3 is a view taken along line 3—3 in FIG. 1.

Container 12 includes an upper portion 36 and a lower portion 38. Lower portion 38 is conically shaped and includes an inner surface 40 upon which material received in container 12 is supported. Upper portion 36 includes an inner surface 42 and a circular opening 44 (best viewed in FIG. 3) at the upper end thereof.

Figure 1:
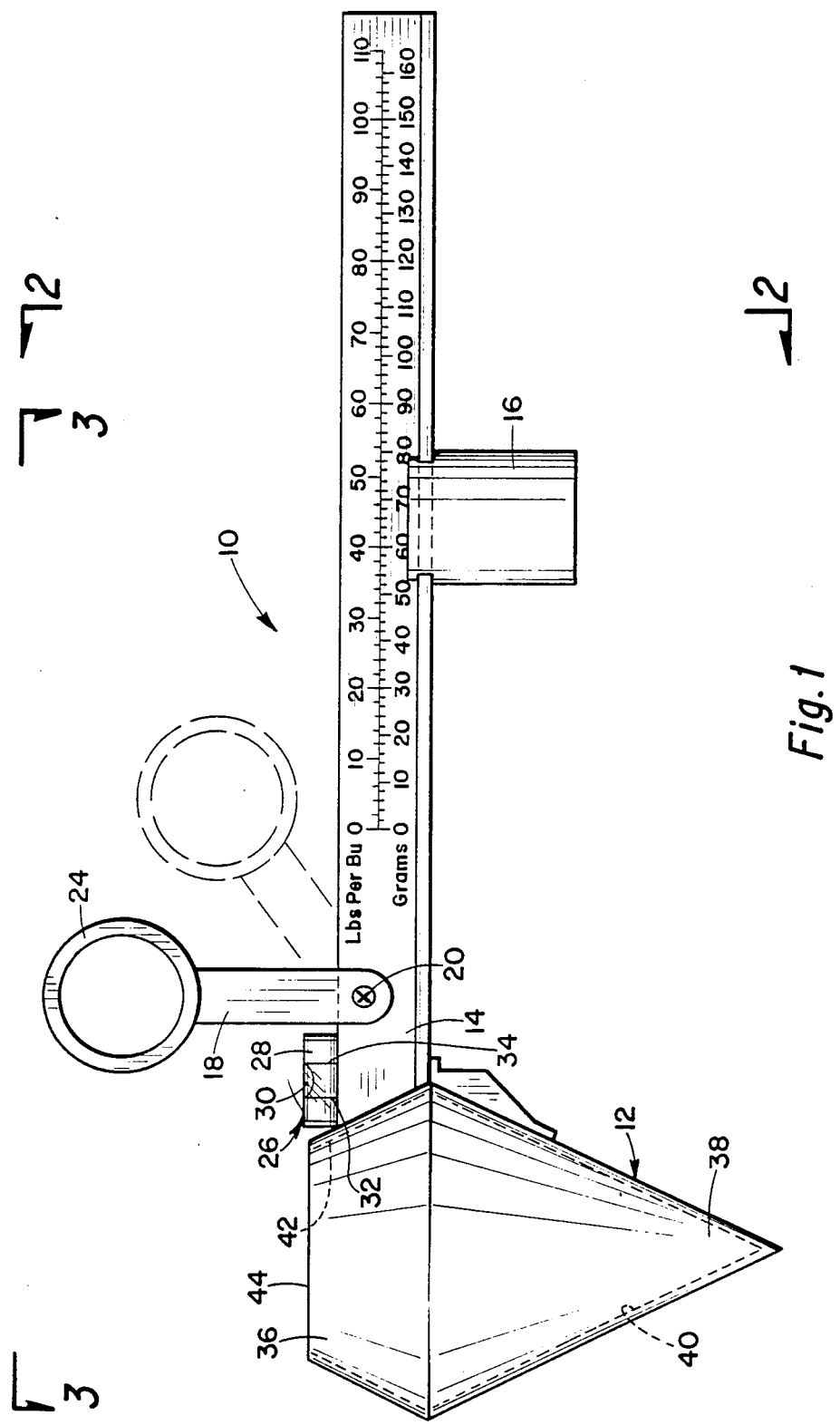
FIG. 1 is a front elevation view of apparatus constructed in accordance with the instant invention.
Figure 4:
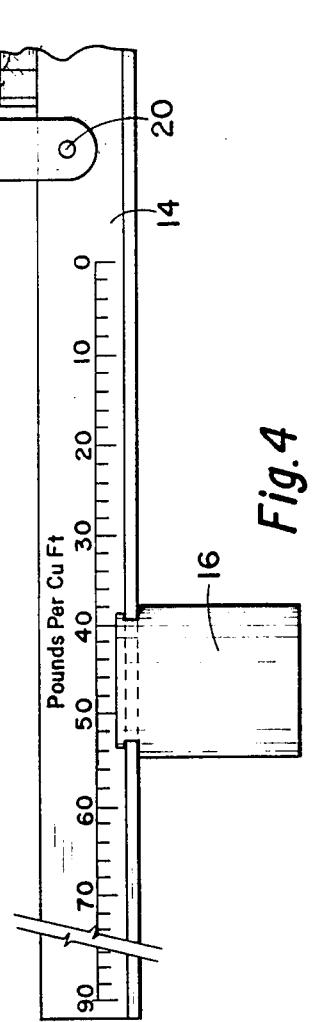
FIG. 4 is a view taken along line 4—4 in FIG. 2.

Arm 14 includes a pounds per bushel scale on the upper portion of one side thereof, such being viewable in FIG. 1; a gram scale on the lower portion thereof, also viewable in FIG. 1; and a pounds per cubic foot scale on the side of arm 14 opposite that shown in FIG. 1, such being viewable in FIG. 4.

Weight 16 includes a slot 44 (in FIG. 2) into which a rail 46 is received. Rail 46 forms the lower portion of arm 14 and thus weight 16 is slidable along the length of the arm. A pair of marks 48, 50 are formed on the upper surface of weight 16 and are used to indicate a reading on the scales on the sides of the arm.

Scale 10, in the instant embodiment of the invention is made of high density plastic.

When it is desired to calibrate a row spreader, also referred to as a planter, in accordance with the method of the instant invention, the row planter is loaded with the seed to be planted. By way of example, assume that the row planter is filled with wheat which is planted at an optimum application of 90 to 100 pounds per acre in rows having center lines which are separated from one another by 6 to 10 inches. Initially, the planter is and the row width is set at, for example, 8 inches. Further assume that it is determined that the exact desired applicating rate is 90 pounds per acre. After the planter is loaded with wheat and the planter control is set to approximate application at a rate of 90 pounds per acre, the planter is hitched to a tractor and moved over the field for a measured length, e.g., 100 feet. Prior to so moving the planter, the spouts from which the seeds are normally dispensed are blocked in a known fashion in order to collect the seed. Thereafter, the amount of seed so caught is placed in container 12 and scale 10 is suspended by ring 24, typically through the finger of a person doing the weighing. Weight 16 is moved along arm 14 until the arm is parallel as indicated by bubble 30 in level 26 being positioned between lines 32, 34. Once the arm is level, the weight of the wheat in grams is determined by examining the number on the gram scale opposite which line 50 on weight 16 is located. In the instant example, assume 55 grams of wheat were so caught.

Figure 5:
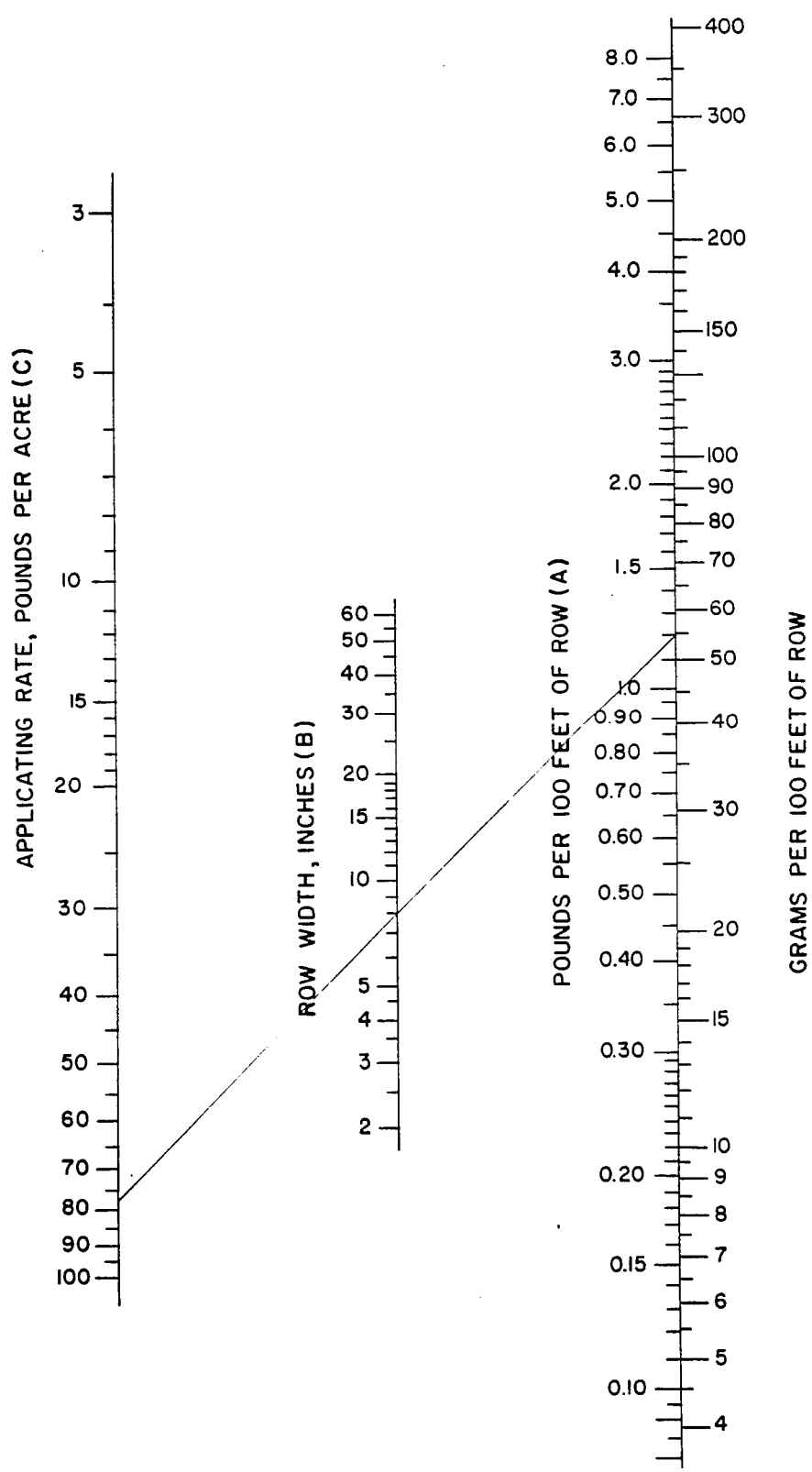
FIG. 5 is a chart for use in accordance with the instant invention for calibrating a row spreader.

Turning now to FIG. 5, scale A is marked at the point showing the weight of the caught wheat, namely 55 grams. If a length other than 100 feet is used for calibration, the weight of wheat caught must be converted to grams per 100 feet of row length. Thereafter scale B is marked at the selected and measured row width, namely 8 inches. Next, a line as shown is drawn between the marks on scales A and B until the line intersects scale C. The line intersects scale C at approximately 77 pounds per acre thus providing an acurate indication of the rate at which wheat is being spread. It can be seen that since the desired rate of spreading is 90 pounds per acre that the control on the planter must be readjusted and the planter moved for another 100 feet with the wheat being again caught. The same procedure may be followed with the graph in FIG. 5 to determine the new applicating rate. As soon as the planter is calibrated to dispense wheat at the rate of 90 pounds per acre, planting is begun.

The graph in FIG. 5 may also be used by marking the desired application rate on scale C and the selected row width on scale B. Thereafter a line may be drawn through the marks on scales C and B to intersect scale A. The intersection of the line with scale A shows, in grams per 100 feet of row, the weight of material which must be produced in 100 feet in order to obtain the applicating rate selected on scale C.

Consideration will now be given to the steps for calibrating a broadcast spreader to produce a desired quantity per acre application of fertilizer. First, a spreader is moved over the field surface for a measured length. As in calibrating the row planter, the material which the applicator would have spread over the surface while it was moved is caught and weighed. The applicator is pulled and permitted to spread material and the width of the material so spread is measured.

Turning now to FIG. 6, the width of the material spread (20 feet in this example) is marked on scale A and the measured length for the calibration run is marked on scale B (50 feet). Thereafter, a line is drawn between the marks on scale A and B to intersect with pivot line C.

Next, the amount of fertilizer caught for the 50 foot calibration run is marked on scale D, namely 500 grams.

It is to be appreciated that the scale has a limit of 160 grams for one weighing so that the material must be divided into smaller portions, each portion weighed, and all of the measured weights added to determine the total weight.

A second line is then drawn between the intersection of the first line with pivot line C and the 500 gram mark on scale D. This line is projected over scale E which indicates a rate of application of about 48 pounds of fertilizer per acre. If this is greater or less than the desired application rate, adjustment is made to the control on the broadcast spreader and another calibration run is made. The process is repeated until the desired application rate is obtained.

If the spreader is moved through the same length on each calibration run, e.g., 50 feet, the line between scales A and B remains fixed. Thus, if a desired application rate per acre is known, the amount of fertilizer caught on the 50 foot calibration run can be determined by drawing a line between the desired application on scale E and the intersection of the first line with pivot line C. The point at which this line intersects scale D is the weight of material that will be caught on a 50 foot run which will produce the desired application per acre.

It is to be appreciated that additions and modifications may be made to the instant embodiments of the method and apparatus of the invention without departing from the spirit thereof which is defined in the following claims.

I claim:

1. A method for calibrating an applicator of the type which uniformly spreads material on a surface as the applicator moves thereover, said method comprising the steps of:
   determining the width of material spread by such an applicator in a single pass;
   moving the applicator over the surface for a measured length;
   catching the amount of material which the applicator would have spread over the surface while it was so moved;
   weighing said caught material;
   locating said width on a first nomograph scale;
   locating said length on a second scale of said nomograph;
   locating the weight per first unit area of said caught material on a third scale of said nomograph; and
   using lines through said located parameters on said first, second, and third scales to locate the weight applied per second unit area on a fourth scale of said nomograph.

2. The method of claim 1 wherein said method further comprises the steps of:

drawing a line through the located points on said first and second nomograph scales and extending the same through a pivot line forming a part of said nomograph thereby defining a pivot line intersection point; and drawing a line through the located point on said third nomograph scale and said intersection point and extending the same through said fourth nomograph scale thereby locating the weight applied per second unit area on said fourth nomograph scale.

3. A method for calibrating an applicator of the type which uniformly spreads material on a surface as the applicator moves thereover, said method using a graph as shown in FIG. 6 and comprising the steps of:

moving the applicator over the surface for a measured length;

catching the amount of material which the applicator would have spread over the surface while it was so moved;

weighing said caught material;

measuring the width over which said applicator spreads material;

drawing a first line on said graph which intersects scale A and B at the measured width and length, respectively;

drawing a second line on said graph which intersects line C at the intersection of said first line with line C and intersects scale D at the measured weight; and reading the amount of material applied per unit area from scale E at the intersection of said second line therewith.

4. A method for calibrating an applicator of the type which spreads material in evenly spaced rows on a surface as the applicator moves thereover, said method using a graph as shown in FIG. 5 and comprising the steps of:

moving the applicator over the surface for a measured length;

catching the amount of material which the applicator would have spread over the surface while it was so moved;

weighing said caught material;

calculating the weight of material which would have been spread per unit length of applicator movement;

measuring the distance between the center line of each row;

drawing a line on said graph which intersects scale A at the calculated weight of material per unit length and intersects Scale B at the measured distance between rows; and reading the amount of material applied per unit area from scale C at the intersection of said line therewith.

5. A method for calibrating an applicator of the type which spreads material in evenly spaced rows comprisng the steps of:

determining the width between the rows of material spread by such an applicator;

moving the applicator over a surface for a measured length;

catching the amount of material which the applicator would have spread over the surface while it was so moved;

weighing said caught material;

dividing the weight of said caught material by said measured length;

locating the weight per unit length on a first nomograph scale;

locating the row width on a second scale forming a part of said nomograph; and drawing a line through the located points on said first and second nomograph scales and extending the same through a third scale forming a part of said nomograph thereby locating the weight applied per unit area on said third nomograph scale.

* * * * *

UNITED STATES PATENT AND TRADEMARK OFFICE
CERTIFICATE OF CORRECTION

PATENT NO. : 4,693,122

DATED : Sep. 15, 1987

INVENTOR(S) : Charles A. Griffith

It is certified that error appears in the above-identified patent and that said Letters Patent is hereby corrected as shown below:

In the specification:   Column 2, line 56 -- When the tube -- should read "When the tube is"

Column 3, line 18 -- the planter is and -- should read "the planter and"

Column 3, line 48 -- acurate -- should read "accurate"

In the claims:   Column 6, line 19 -- prisng -- should read "prising"

Signed and Sealed this

Second Day of February, 1988

Attest:

DONALD J. QUIGG

*Attesting Officer*   *Commissioner of Patents and Trademarks*